(12) United States Patent
Robinson et al.

(10) Patent No.: US 7,815,061 B1
(45) Date of Patent: Oct. 19, 2010

(54) FRICTION SURFACE FOR PUSH AND TURN CHILD RESISTANT CLOSURE

(75) Inventors: Clayton Robinson, Elberfeld, IN (US); William J. Shankland, Evansville, IN (US)

(73) Assignee: Rexam Closures and Containers, Evansville, IN (US)

( * ) Notice: Subject to any disclaimer, the term of this patent is extended or adjusted under 35 U.S.C. 154(b) by 973 days.

(21) Appl. No.: 11/278,190

(22) Filed: Mar. 31, 2006

(51) Int. Cl.
B65D 55/02 (2006.01)

(52) U.S. Cl. .................. 215/220; 215/221; 215/384; 220/259.3; 220/259.4

(58) Field of Classification Search ............ 215/220, 215/221, 219, 251; 220/254.8, 259.4
See application file for complete search history.

(56) References Cited

U.S. PATENT DOCUMENTS

| | | | |
|---|---|---|---|
| 351,875 A | 11/1886 | Marsh | |
| 1,949,058 A | 2/1934 | Leguillon | |
| 2,598,403 A | 5/1952 | Macey | |
| 3,107,829 A | 10/1963 | Makowski | |
| 3,141,580 A | 7/1964 | Rogers | |
| 3,191,806 A | 6/1965 | Schultz et al. | |
| 3,276,640 A | 10/1966 | Kessler | |
| 3,439,842 A | 4/1969 | Stull | |
| 3,472,411 A * | 10/1969 | Turner | 215/220 |
| 3,738,545 A | 6/1973 | Roy | |
| 3,944,102 A * | 3/1976 | Grau | 215/251 |
| 4,011,829 A * | 3/1977 | Wachsmann et al. | 116/308 |
| 4,151,924 A | 5/1979 | Jameson | |
| 4,284,201 A * | 8/1981 | Nixon | 215/220 |
| 4,314,656 A | 2/1982 | Kessler | |
| 4,408,700 A | 10/1983 | Fillmore et al. | |
| 4,497,765 A | 2/1985 | Wilde et al. | |
| 4,500,005 A * | 2/1985 | Forrester | 215/203 |
| 4,520,938 A * | 6/1985 | Finke | 215/220 |
| 4,603,785 A * | 8/1986 | Gach | 215/230 |
| 4,605,135 A * | 8/1986 | Ryder | 215/220 |
| 4,669,620 A * | 6/1987 | Coifman | 215/220 |
| 4,673,095 A * | 6/1987 | Puresevic et al. | 215/220 |
| 4,749,103 A | 6/1988 | Barriac | |
| 4,771,911 A * | 9/1988 | Morony et al. | 220/592.16 |

(Continued)

OTHER PUBLICATIONS http://www.okeeffescompany.com/our_products/working_hands/; It shows how the lid fits on the package; Copyright © 2006 Working Hands Creme, Inc.; USA.

*Primary Examiner*—Anthony Stashick
*Assistant Examiner*—Christopher B McKinley
(74) *Attorney, Agent, or Firm*—Chad D. Bruggeman; John F. Salazar

(57) ABSTRACT

A push and turn child resistant closure is provided which includes a combined over cap and under cap, the under cap freely rotational within the over cap and the combined closure installed on the container. For removal of the combined closure, both downward and counter-clockwise rotational force is applied to the over cap, the rotational force imparted on the under cap more readily by utilization of a friction ring at the engagement area between the over cap and the under cap while also having an outer gripping ring of highly frictional material making it much more easily rotatable and graspable by a user. The use of a highly frictional material more readily imparts rotational force on the under cap when utilized as depicted herein.

7 Claims, 8 Drawing Sheets

U.S. PATENT DOCUMENTS

| | | | |
|---|---|---|---|
| 4,826,055 A | 5/1989 | Stull | |
| 4,830,206 A * | 5/1989 | Fisher | 215/209 |
| 4,832,218 A * | 5/1989 | Gibilisco | 215/220 |
| 4,927,065 A | 5/1990 | Beck | |
| 4,967,941 A | 11/1990 | Beck | |
| 4,979,648 A | 12/1990 | Montgomery et al. | |
| 5,104,008 A | 4/1992 | Crisci | |
| 5,112,628 A | 5/1992 | Conrad | |
| 5,145,094 A | 9/1992 | Perlmutter | |
| 5,169,035 A | 12/1992 | Imbery, Jr. | |
| 5,188,251 A * | 2/1993 | Kusz | 215/220 |
| 5,280,842 A * | 1/1994 | Koo | 215/220 |
| 5,316,161 A * | 5/1994 | Gargione | 215/220 |
| 5,328,063 A | 7/1994 | Beck et al. | |
| 5,332,127 A | 7/1994 | White | |
| 5,429,282 A | 7/1995 | Stebick | |
| 5,472,120 A | 12/1995 | Stebick et al. | |
| 5,577,625 A | 11/1996 | Baird et al. | |
| 5,588,562 A | 12/1996 | Sander et al. | |
| 5,620,117 A | 4/1997 | Bieze et al. | |
| 5,667,085 A * | 9/1997 | Ogden et al. | 215/220 |
| 5,743,444 A | 4/1998 | Beck et al. | |
| 5,762,215 A * | 6/1998 | Ogden | 215/220 |
| 5,810,185 A | 9/1998 | Groesbeck | |
| 5,829,609 A | 11/1998 | Beck | |
| 5,829,611 A | 11/1998 | Beck | |
| 5,975,369 A | 11/1999 | Yurkewicz et al. | |
| 6,213,351 B1 | 4/2001 | Stoneberg et al. | |
| 6,257,463 B1 | 7/2001 | De Polo | |
| 6,286,733 B1 | 9/2001 | Francois | |
| 6,299,038 B1 | 10/2001 | Schmeisser et al. | |
| 6,321,924 B1 | 11/2001 | Yurkewicz et al. | |
| 6,338,425 B1 | 1/2002 | Berge et al. | |
| 6,477,743 B1 | 11/2002 | Gross et al. | |
| 6,772,910 B1 | 8/2004 | Coory | |
| 2004/0262251 A1 * | 12/2004 | Tauber | 215/220 |
| 2005/0161425 A1 * | 7/2005 | Morini | 215/204 |
| 2006/0108313 A1 * | 5/2006 | Brozell et al. | 215/220 |

* cited by examiner

FRICTION SURFACE FOR PUSH AND TURN CHILD RESISTANT CLOSURE

BACKGROUND OF THE INVENTION

The present invention is directed towards a bi-injected two-piece push and turn child resistant closure, the push and turn closure having a friction ring interposed between the over cap and under cap to aid in removal of the push and turn child resistant closure and more readily impart rotational from downward force. The design of the present invention also incorporates in a bi-injected single or double shell closure design having slide rails on the closure in combination with gripping surfaces, the slide rails allowing for more ready handling of the closure since the high friction characteristic of the gripping surface can prevent normal closure machine handling operations.

DETAILED DESCRIPTION OF THE PREFERRED EMBODIMENTS

Figure 1:
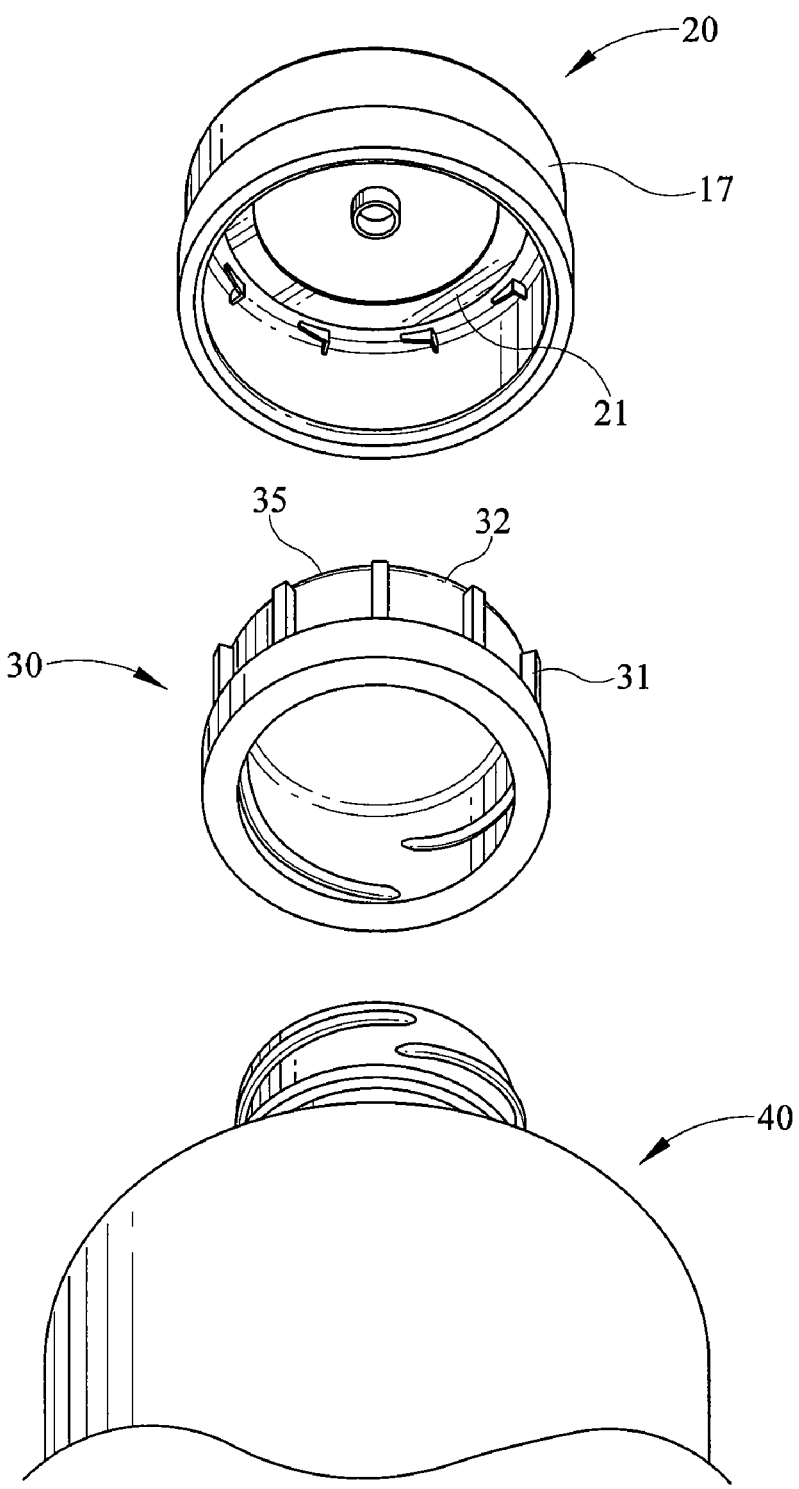
FIG. 1 is an exploded view of the friction surface for push and turn child resistant closure of the present invention with an exemplary container shown.
Figure 2:
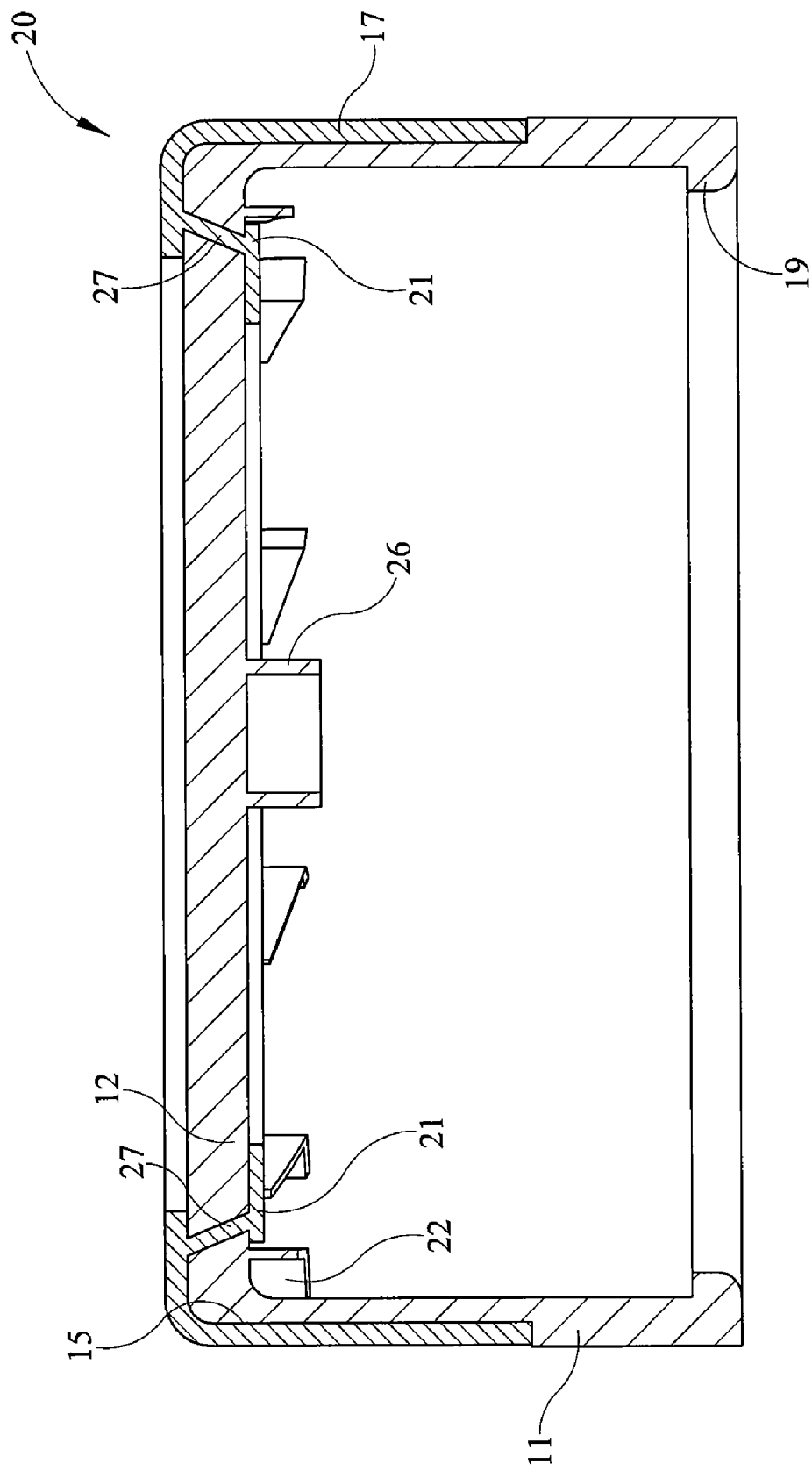
FIG. 2 is a side-sectional view of the over cap for the push and turn child resistant closure of the present invention.
Figure 3:
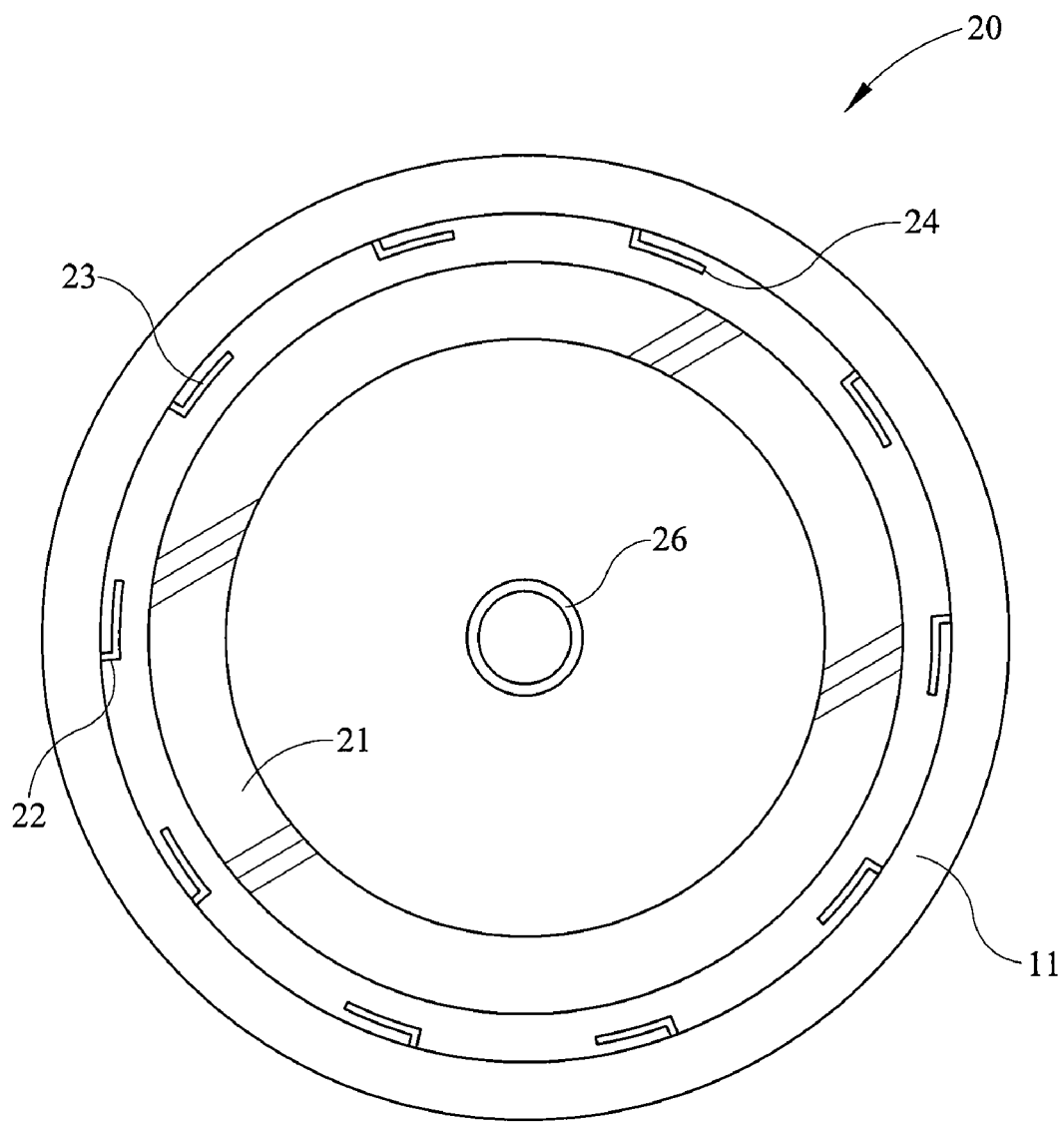
FIG. 3 is a bottom view of the over cap shown in FIG. 2.
Figure 4:
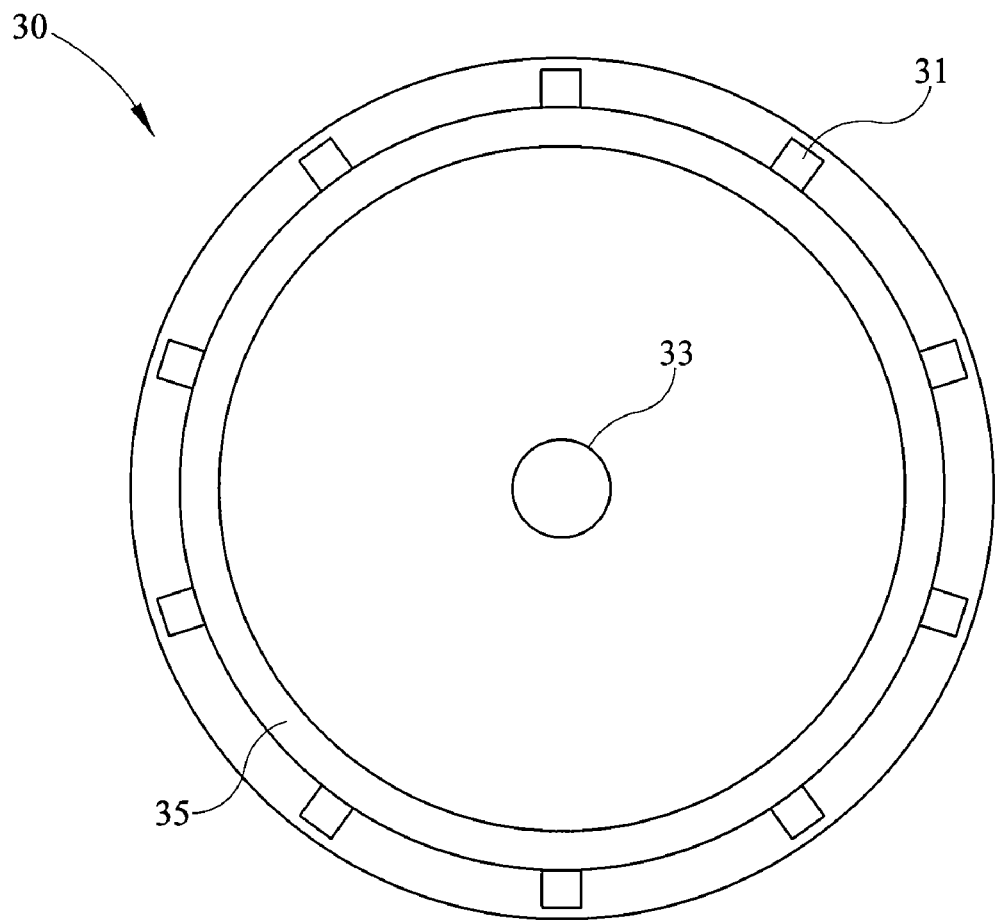
FIG. 4 is a top view of the under cap of the push and turn child resistant closure of the present invention.

Referring to FIG. 1, a two-piece push and turn child resistant closure is depicted wherein an over cap 20 rotatably receives an under cap 30, the under cap 30 retained and rotatable within said over cap 20 by virtue of engagement of a retaining bead 19, depicted in FIG. 2, of the over cap and a bottom edge of the side wall of the under cap. Under cap 30 is rotatable within over cap 20 and has a plurality of child resistant features, child resistant features on the under cap 30 in the present embodiment being the vertical ribs 31 which extend along an upper periphery of the side wall of the under cap 30. The features or ribs 31 engage with corresponding child resistant engagement surfaces on the over cap 20 such that said over cap 20, when rotated in the counter-clockwise position, freely slides over the ribs 31 without unthreading the under cap 30 from the container 40. However, upon downward force of the over cap 20, in combination with counter-clockwise rotation of the over cap 20, child resistant feature 31 on the under cap 30 engages the shortened front face 24 of the child resistant feature 22 on the over cap 30 thereby preventing the rib or feature 31 on the under cap from sliding upward on ramp 23 of feature 22 and allowing rotational movement to be imparted from the over cap 20 onto the under cap 30. Thus, for the two-piece push and turn child resistant closure depicted, downward force is applied to the over cap 20 and imparts rotational movement onto the under cap 30 thereby making the combination two-piece push and turn child resistant closure in fact child resistant.

Many varying embodiments of engagement between an over cap and an under cap for a two-piece push and turn child resistant closure may be utilized and the engagement of the ribs or features 31 on the under cap 30 in combination with the engagements features 22 of the over cap 20 and particularly the ramp 23 and front face 24 of the features 22 on the over cap, are but only one of many different variations known to impart rotational force for a child resistant closure on a push and turn two-piece closure system. These variations and modifications are considered to fall within the teachings hereof as these multiple implementations for push and turn closures are known and have been implemented in the prior art and no distinct limitation should be interpreted into the claims appended hereto by the particular examples depicted within the figures or described in the specification.

It may be desirable when imparting rotational motion on the over cap 20 to make similar rotation of the under cap 30 easier while still maintaining the child resistant functionality of the two-piece push and turn child resistant closure system. The present embodiment depicted utilizes an annular friction ring which extends along a lower surface of the top wall 12 of the over cap 20, the friction ring 21 in corresponding alignment with a contacting ring or surface 35 on the outer portion of top wall 32 of the under cap 30. As shown in FIGS. 1-4, downward pressure of the over cap 20 onto the under cap 30 engages the friction ring or contacting section 21 such that the contacting ring 35 becomes a working surface engaged with said friction ring 21, rotational movement of the over cap 20 thus more readily transferred to the under cap 30 due to the high friction surface of the contact section 21 of the over cap 20 against this working surface. As may be readily understood, in common applications of two-piece push and turn child resistant closures, both the over cap 20 and under cap 30 may be made of polypropylene or other similar material. However, when two adjoining surfaces of polypropylene engage each other, they readily slide past one another due to their relatively low coefficient of friction. As a result of these low frictional surfaces engaging each other between the over cap and the under cap, much more downward force is required in order to adequately translate rotational force onto the under cap once engagement of the child resistant features occurs. However, when highly frictionalized surfaces engage one another, such as is disclosed herein with the present novel high friction engagement surfaces, less downward force is required to apply rotational force to remove a two-piece push and turn child resistant closure. The mechanical benefit of using these frictionalized surfaces may be further increased by shaping the mating faces of opposed surfaces such as by making an upper surface have a protruding curved or angled surface while the lower surface may have a corresponding inverse shape to receive such protrusion or shape. Such opposing faces may further aid by reducing the necessary force for rotation to overcome child resistant feature. As a result of using a material having a relatively lower empirical hardness such as a softer plastic or highly frictional material, such as a rubber and polypropylene blend which may be, for example, thermo-plastic elastomer, thermo-plastic valcanates, polyolefins, fluoropolymers and vinyls, the rotational force between the two surfaces of the over cap 20 and under cap 30 may be more readily translated without necessarily requiring larger downward translating to rotational force. Further, this same highly frictional material which has a softer characteristic having a relatively low resistance to indentation measured under the Shore A scale, can be bi-injected onto the exterior surface of the closure to create a gripping surface as is depicted in the examples set forth. This material may thus be utilized in both creating a gripping surface on the exterior of a closure and also in creating an engagement surface on the interior or contacting portion between under cap and over cap. This highly frictional material, as indicated, can be applied using bi-injection molding techniques described herein.

In the exemplary embodiment shown in the figures, a friction ring 21 is positioned on the lower surface of top wall 12 of the over cap 20, the friction ring 21 made of a highly frictional material such as TPE or TPV or any similar rubber/elastomer material which may be readily molded using bi-injection molding process with a first harder material forming the over cap 20. This highly frictional material may alternatively be applied to the over cap 20 as depicted through adhesion or any other mating process. The second softer and more frictional material as depicted in the example of FIG. 1, may be molded to form a frictional surface in an annular construction as shown, but many different constructions may be utilized such as intermittent positions of contacting surfaces on the underside of top wall 12 or other similar constructions along the side wall or other positions including the top wall 32 of under cap 30, the goal merely being to increase the frictional engagement between surfaces of the over cap 20 and the under cap 30 in order to impart more readily rotational movement on the over cap 20 to the under cap 30.

Figure 5:
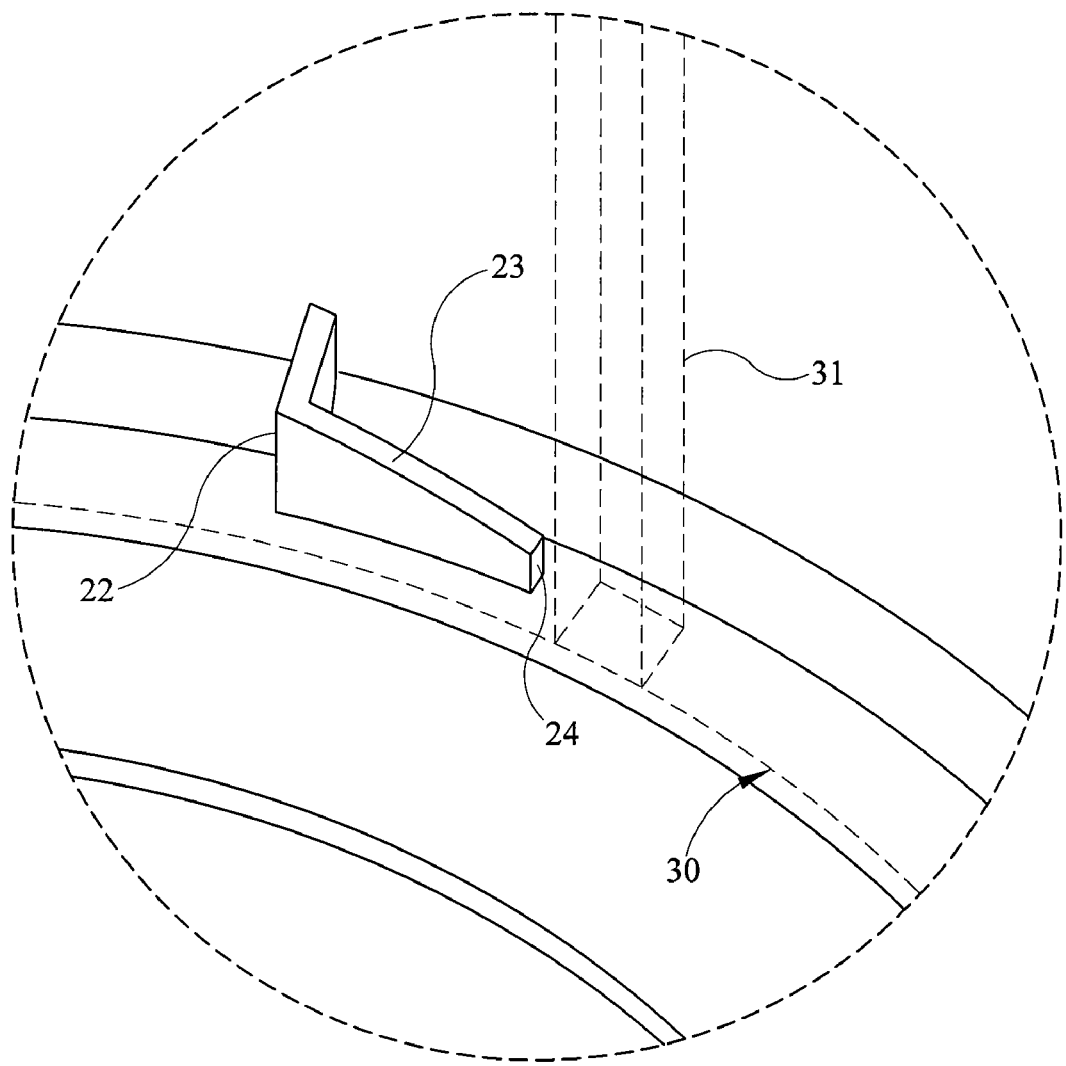
FIG. 5 is a close up view of the inner action of the friction ring, under cap and over cap for the two-piece push and turn child resistant closure of the present invention.

Turning again to the exemplary embodiment shown herein, an annular friction ring is depicted, the annular friction ring 21 being positioned interiorly of the engagement structures 22 which are adjacent to the side wall 11 on the underside of the over cap 20. As shown in FIG. 2, the engagement structures 22, in combination with the exemplary embodiment shown in FIG. 5, are primarily made of a ramp surface 23 and a shortened front face 24, the front face 24 provided to engage the upwardly extending ribs or engagement surfaces 31 on the under cap 30. The friction ring 21 is shown in FIG. 2 as being positioned interiorly from the features 22 and is positioned such as to be in contacting alignment with contacting ring or other type surface 35 placed on the upper surface of top wall 32 of under cap 30. Surface 35 may be formations, flat, planar or annular, and may also be intermittent. As downward force is applied to the over cap 20 after the over cap and under cap are installed together and placed on a container 40, the friction ring 21 engages the contacting ring 35 such that rotational force is directly and more readily applied and translated from the over cap 20 to the under cap 30. The position of the friction ring 21 may be significantly varied to accomplish the recited function herein and no particular limitation is to be interpreted from the examples depicted in the present embodiment.

Under cap 30 is rotationally held within over cap 20 by virtue of retaining bead 19 which contacts the bottom edge of the side wall of the under cap 30. In order to aid rotational movement of the under cap 30 within the over cap 20, a stem 33 extends upward from the top wall 32 of the under cap 30 and is received within the annular receptacle 26 placed on the bottom surface of top wall 12 thereby allowing the under cap 30 to freely rotate within the over cap 20, ribs 31 sliding over the engagement features 22 by virtue of ramps 23 thereby allowing the over cap 20 to freely rotate in counter-clockwise fashion without unthreading under cap 30 from container 40 unless downward pressure and force is correspondingly applied. While threading onto a container the combined over cap 20 and under cap 30, the engagement surfaces 31 on the under cap 30 strike the engagement face 22 of FIG. 5 thereby easily imparting clockwise rotational force onto the under cap 30 since the height of the leftmost portion of engagement face 22 is significantly larger than the front face 24. Thus, with the embodiment shown in the figures, downward force is required to remove the under cap 30 from the container 40, the child resistant feature being implemented by the requirement of both counter-clockwise rotational force and downward pressure being applied to the over cap 20 in order to remove under cap 30 from container 40.

Turning to FIG. 2, the friction ring 21 in this embodiment and example is an annular friction ring in order to maximize the contacting surface between the over cap 20 and under cap 30. Additionally, a griping ring 17 may be formed on an outer surface of the side wall 11 of the over cap 20, the grip ring 17 formed of a similar high frictional material such that the over cap 20 may be easily grasped and rotated accordingly. The grip ring 17 depicted in FIG. 2 may extend annularly about the side wall 11 and may also extend to a portion of the top wall 12. Many alternative constructions may be utilized for a grip ring such that a highly frictional material may be utilized and contacted by a user of the closure depicted herein, such as intermittent positions of highly frictional material, griping pads, vertical striping or other similar constructions and these alternative constructions are deemed to fall within the teachings hereof.

As may be understood by one of ordinary skill in the art, molding of the over cap 20 with the highly frictional material, may be accomplished in many different methods. As shown in FIG. 2, at least one flow channel 27 may interconnect the position of the friction ring 21 and the grip ring 17 such that in the injection process for a bi-injected polypropylene and rubber and elastomer closure, the highly frictional material may flow from the position of the friction ring 21 to the position of the grip ring 17, or vise versa. As shown in FIG. 2, a plurality of flow channels may be provided which may readily allow flowing of the highly frictional material from one position to the other, the flow channels positioned intermittently around top wall 12 such that the highly frictional material may readily flow and set in position, as required in both the upper and lower surfaces of the over cap 20. In the present embodiment, a plurality of gaps or apertures may be formed in the top wall 21, the gaps or apertures formed in the relatively harder first material of the underlying closure 20. By virtue of utilizing TPE or TPV, adhesion of the rubber directly to the polypropylene may be increased as opposed to simply using other highly frictional material without a polypropylene content. The flow channels 27, as indicated, may be a plurality of gaps, slots, or any other like device which allows movement of material between the surfaces on the interior or exterior of the over cap during the molding process. Such molding may be conducted by co-injection, rotary platen, horizontal rotary platen or even indexing plate injection systems as are known in the art. It may be desirable however, that such highly frictional material may be injection molded in a bi-injection process in order to position the highly frictional surfaces at the appropriate working surfaces where the over cap and under cap engage after downward force in applied in combination with counter-clockwise rotational movement. Alternative process and constructions may also be utilized.

The highly frictional material as depicted herein, thermoplastic elastomers or thermo-plastic vulcantes, may be a rubber and polypropylene blend material. The polypropylene blended in with the rubber allows ready bonding between the highly frictional material and the polypropylene over cap 20. Additionally, the highly frictional material depicted in the example making up the friction ring 21 and the grip ring 17 may have varying hardness as compared on the Shore A or D scales. Fairly soft resins may be utilized which allow single handed opening of the push and turn child resistant closure. By utilizing such a softer material in both the grip ring 17 and the friction ring 21 as depicted in the examples, it is easier to push and rotate in counter-clockwise fashion the push and turn child resistant closure of the present invention.

It may be desirable to bi-inject the softer material discussed herein to an outer portion of the closure in order to aid in turning or grasping of the closure, as is utilized in the gripping ring 17 depicted. Such larger gripping surface area may benefit the user of the closure in many ways, from providing to a soft supple grip area for turning or handling of the closure, to allowing for color contrasting material to be placed on the closure top wall, side walls or else where.

Due to the high frictional characteristic of the TPE or other gripping surface material chosen, the high frictional soft material may extend to a closure outer diameter such that is can contact a flat exterior surface. In such an instance, the material handling equipment may have difficulty in moving the finally formed and bi-injected closure 60 along standard closure handling pathways either after bi-injection or prior to capping onto a container. Thus, in the design depicted in FIG. 6, the closure 60 has side wall slide rail 52 made of a reduced frictional surface extending outward and beyond the gripping surface 53. The closure top surface may have a top surface slide rail 55 which extends above the uppermost extent of the gripping surface 53 so that the closure 60 has extending to its outermost diameter, the side wall slide rail 52 and to its uppermost position, the top surface slide rail 55, both of which are formed of polypropylene or similar low friction material. Both the slide rails 52 and 55 may act as slide means for preventing the rubberized material on the closure from contacting either a vertical or horizontal surface on a machine handling apparatus. The underlying polypropylene closure depicted in FIG. 6, has a recessed area along the top portion of the side wall which receives the bi-injected material thereby allowing the slide rail to extend outward and beyond the high friction material injected after formation of the underlying closure. This low friction hard surface first material forming the underlying portion of the cap and forming the side wall slide rail 52 and top surface slide rail 55 aids in subsequent material handling by preventing the rubberized highly frictional material from contacting other machinery.

Figure 6:
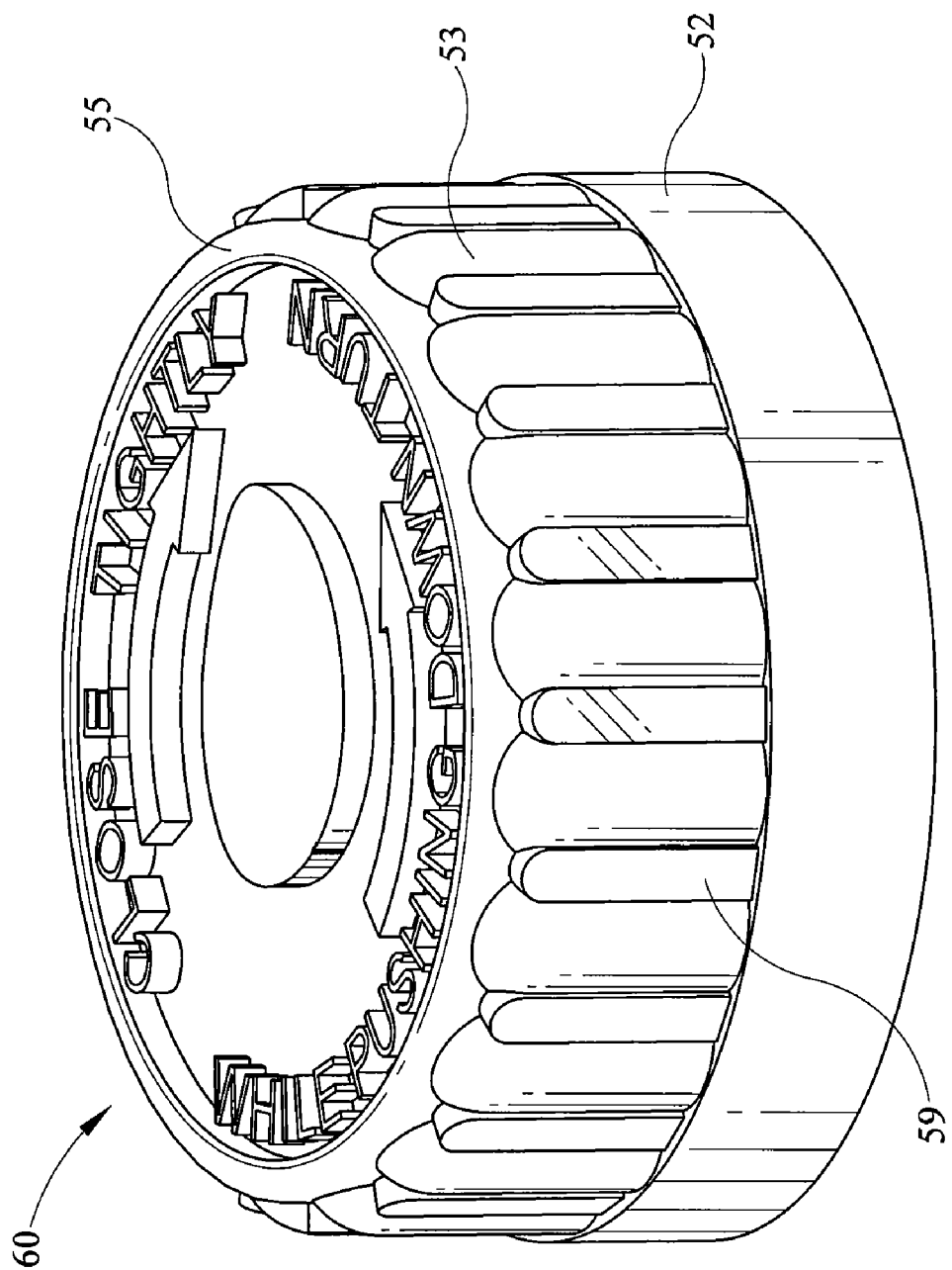
FIG. 6 is a perspective view of the bi-injected closure of the present invention having a slide rail.

Referring to FIG. 6, an alternative embodiment of the present invention is depicted. As shown therein, single shell closure 60 has gripping surface 53 which is a highly frictional material, such as for example TPE, and which exhibits a tacky characteristic and aids in the grasping and turning of the closure 60. Additionally formed on the closure 60 depicted in FIG. 6 is the side wall slide rail 52 along a lower periphery therein. The construction of the closure 60, depicted in FIG. 6, is such that the gripping surface 53 is inset into the side wall of the cap, the closure 60 having a recessed portion along the side wall thus causing the gripping surface to have an outer diameter which is smaller than the outer diameter of the side wall slide rail 52. By providing such a design, the gripping surface 53 after molding does not extend outward beyond the side wall slide rail 52. The slide rail 52 may extend a millimeter or more beyond the outer diameter of the second softer material forming the gripping surface 53. This extension however can be kept minimal as long as the surface effectively acts to prevent the rubberized material or frictional material to contact handling surfaces which can include distances less than a millimeter.

As can be understood, the underlying first material for the closure 60 depicted in FIG. 6 may be made of polypropylene or any relatively similar hard or low friction material. The gripping surface 53 may be bi-injected or assembled material and may be formed over the outer surface of the closure 60. This gripping surface material has a much higher frictional characteristic and may be injected using many techniques and be present on the exterior, interior or through various pathways or channels designed to allow flow of the bi-injected material to pass from an insertion point through the walls of the closure, if necessary.

Figure 7:
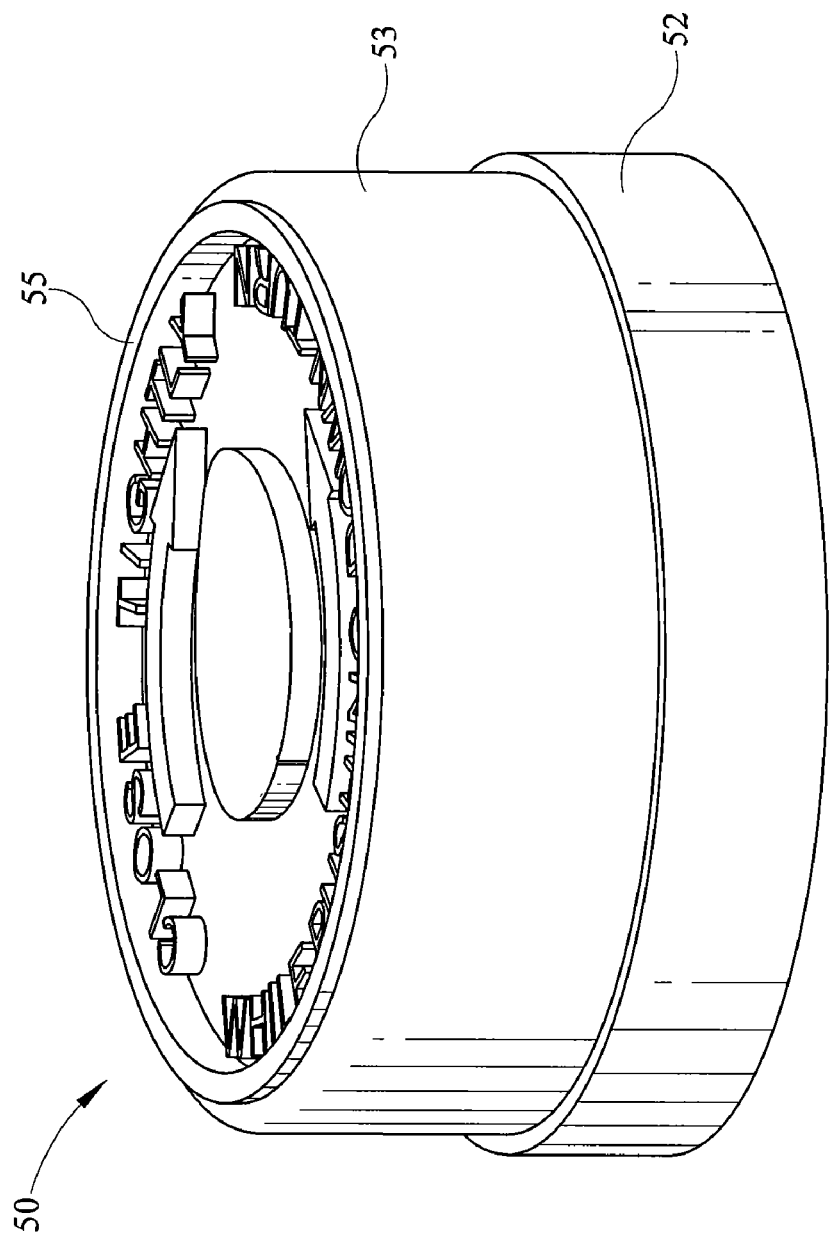
FIG. 7 is a side view of another embodiment of a closure of the present invention having multiple slide rails.

A further embodiment is depicted in FIG. 7, wherein a continuous gripping surface 53 is shown. As can be seen, the side wall slide rail 52 extends outward beyond the outermost diameter of the grip surface 53 thereby aiding in the sliding motion and handling of the closure 50 depicted therein. Additionally, extending upward from the top surface thereof is the top surface slide rail 55, both the top surface slide rail 55 and the side wall slide rail 52 effectively preventing the grip surface 53 and the high friction material forming said grip surface from directly contacting machine handling equipment as the formed closure 50 travels either after injection molding or prior to capping on the container.

As depicted in FIG. 6 and FIG. 7, the underlying closure of the present design is formed by standard injection molding techniques known in the art of a polypropylene or similar material. Alternative materials may be utilized which are known in the art and which are readily available for use in the closure industry which may act as underlying support for a bi-injected high frictional. This includes the ability to be deformed for child resistant purposes, proper barrier characteristics and also proper seating characteristics, among others. The choice of materials described herein is not deemed to be limiting. In the designs depicted in FIG. 6 and FIG. 7, the inset recess formed on the underlying closure 50, 60 are such that an outermost surface of the side wall or the top wall provides a smooth low friction surface for material handling and prevention of the TPE from binding or gripping on machinery. These recesses on the side wall may be a functional clearance amount below one millimeter or one to two millimeters or more in depth, and the top surface slide rail 55 may extend upward beyond the upper extent of the gripping surface by similar amounts or less. These distance limitations however are to be construed as exemplary only since the intent is merely to prevent the TPE or frictional material from binding on a machinery surface.

Figure 7A:
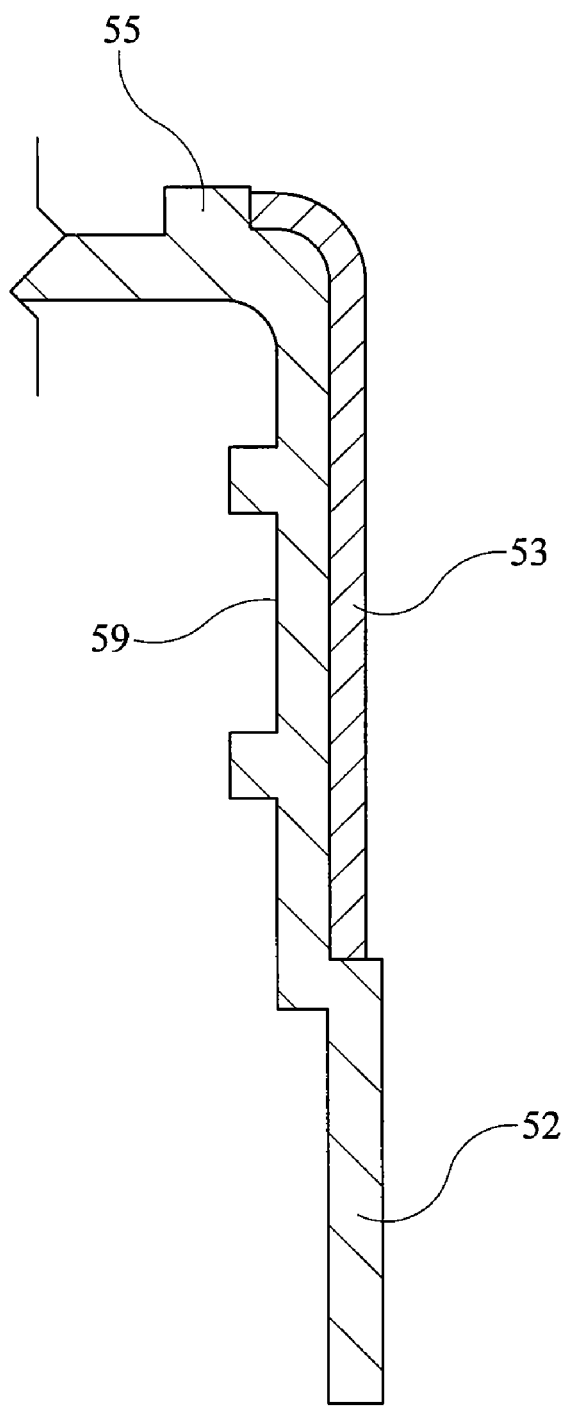
FIG. 7a is a side section of the bi-injected closure having slide rails of the present invention.

Turning to FIG. 7a, it can be seen that the closures 60, 50 depicted in FIG. 6 and FIG. 7 has an annular lower portion formed by the side wall slide rail 52 which extends outward beyond the outermost diameter of the gripping surface 53. The polypropylene or other relatively hard plastic material which forms the slide rail 52 extends upward to a second portion of the side wall of the closure forming the recessed side wall 59 which is overlaid by the second material in a bi-injection process to form a gripping surface 53 as is depicted. The recessed side wall portion 59 is recessed sufficiently and inset from the outer diameter of the annular slide rail 52 such that the overlaid high frictional grip surface material 53 depicted does not extend outward and beyond the annular slide rail 52. As can also be seen, the grip surface material 53 extends upward and may extend onto the top wall. In such a construction where the high frictional gripping material extends upward to the top wall, it may be desirable to have the upwardly extending top surface slide rail 55 which, as can be seen, extends upward as a flange or other obstruction extending beyond the uppermost position of the gripping surface material 53. Depending on the machine handling equipment and necessity of moving the bi-injected closure, the top surface slide rail 55 as depicted may be constructed in many different forms and may be optional. Having a top surface slide rail in any form can aid in transporting the closure in a machine handling apparatus, particularly if the closure is inverted after molding, such as being upside down. In such instance, the closure should have, in combination with the rubberized gripping material, a slide rail extending outward on the top wall, possibly a slide rail on the side wall as depicted, and assurances that the slide rail extends below the closure along the bottom rim of the side wall.

Alternative constructions of the slide rail 52 which extends about the closures depicted and the exemplary embodiments may be provided. Of necessity is the contacting of the slide rails 52 or of any surface which extends circumferentially, partially circumferentially or beyond the material 53 against the machine handling apparatus. In particular, with the inclusion of the high frictional TPE material, sliding rails or contacting surfaces may be provided in order to allow for smooth handling and transitioning of the closure within machinery. Such can be accomplished with the embodiments depicted or with alternative construction such as outwardly extending ribs in place of the recessed side wall 59 depicted in FIG. 6. Such outwardly extending ribs or vertical structures may extend beyond the outer periphery of the TPE in order to provide a smooth contacting surface with low friction material exposed against the machine handling apparatus while also providing intermittently spaced high frictional gripping type material interposed in between the vertical or other ribs. In such a construction, the intermittently spaced ribs may be positioned circumferentially about the exterior side wall of the closure and may be spaced so as to assure that the low friction material will always be in contact with the machine handling apparatus while also assuring that sufficient high frictional gripping material may be available and contact a user's hand when handling the closure.

Such structure may be accomplished through lengthening the radial extension or outer diameter of vertical ribs made of the low friction material, thereby reducing the total number of vertical ribs required on the periphery of the closure side wall, or decreasing the radial length of the vertically extending ribs and increasing the frequency of position on the closure side wall. Commonly, the adequate placement of ribs on the side wall of the closure can be determined when connecting adjacent ribs with a line and assuring such line does not intersect the outer periphery of the gripping surface material 53.

A number of embodiments have been provided herein to provide proper description of the invention. However, no unnecessary limitation should be construed from these examples and embodiments as many variations to the structures recited may be implemented without departing from the spirit of the present invention or falling outside of the appended claims.

The invention claimed is:

1. A push and turn child resistant two-piece closure comprising:
    an under cap rotationally retained within an over cap, said over cap having a plurality of push and turn over cap features in engagement with a plurality of push and turn under cap features on said under cap;
    a central stem extending upward from a top surface of said under cap and is received within a receptacle on a bottom surface of a top wall of said over cap;
    said under cap having said top surface engaging said bottom surface of said over cap only when downward pressure is applied to said over cap;
    said engaging interface between said bottom surface of said over cap and said top surface of said under cap having a friction ring interposed therebetween, wherein said friction ring having an inner diameter and an outer diameter;
    said friction ring made of a highly frictional material to aid in the counter clockwise rotation of said push and turn child resistant two piece closure when only downward pressure and rotation is applied to said over cap to remove said closure from a container neck; and
    wherein said under cap top surface has a mating contacting ring in alignment with said friction ring.

2. A push and turn child resistant two-piece closure of claim 1, wherein said friction ring is affixed against said bottom surface of said over cap.

3. A push and turn child resistant two-piece closure of claim 1, wherein said friction ring made of thermo-plastic elastomer.

4. A push and turn child resistant two-piece closure of claim 3, further including a grip ring affixed against an outer surface of said over cap.

5. A push and turn child resistant two-piece closure of claim 4, wherein said friction ring and said grip ring are in channel flow communication when said friction ring is molded.

6. A push and turn child resistant two piece closure of claim 1, wherein said friction ring is made of thermo-plastic elastomer and said over cap and said under cap are made of polypropylene.

7. A push and turn child resistant two piece closure of claim 1, wherein said over cap and said under cap are made of a first material, said friction ring is made of a second material, said first material having a much lower coefficient of friction than said second material.

* * * * *